US012688123B2

(12) United States Patent
Adhinarayanan et al.

(10) Patent No.: US 12,688,123 B2
(45) Date of Patent: Jul. 21, 2026

(54) ARITHMETIC LOGIC UNIT (ALU) IN A BASE DIE OF A PROCESSING-IN-MEMORY COMPONENT WITH CROSS-ALU DATA COMMUNICATION CAPABILITY

(71) Applicant: Advanced Micro Devices, Inc., Santa Clara, CA (US)

(72) Inventors: Vignesh Adhinarayanan, Austin, TX (US); Hyung-Dong Lee, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/622,245

(22) Filed: Mar. 29, 2024

(65) Prior Publication Data

US 2025/0307142 A1     Oct. 2, 2025

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .......................... G06F 12/0802; G06F 2212/60
See application file for complete search history.

(56) References Cited

U.S. PATENT DOCUMENTS

| | | | |
|---|---|---|---|
| 5,940,850 | A | 8/1999 | Harish et al. |
| 6,118,723 | A | 9/2000 | Agata et al. |
| 8,161,245 | B2 | 4/2012 | Fields, Jr. et al. |
| 8,706,969 | B2 | 4/2014 | Anderson et al. |
| 8,947,931 | B1 | 2/2015 | D'Abreu |
| 9,450,023 | B1 | 9/2016 | Konevecki et al. |
| 9,582,282 | B2 | 2/2017 | Hayenga et al. |
| 11,152,056 | B1 | 10/2021 | Seo et al. |
| 11,251,155 | B2 | 2/2022 | Lee et al. |
| 11,487,447 | B2 | 11/2022 | Islam et al. |
| 11,853,220 | B2 | 12/2023 | Bondarenko et al. |
| 2003/0009632 | A1* | 1/2003 | Arimilli .............. G06F 12/0862 711/146 |
| 2005/0198439 | A1 | 9/2005 | Lange et al. |
| 2008/0054489 | A1 | 3/2008 | Farrar et al. |
| 2008/0232185 | A1 | 9/2008 | Bartley et al. |
| 2012/0087183 | A1 | 4/2012 | Chang |

(Continued)

OTHER PUBLICATIONS

Panda, et al. "Prefetching Techniques for Near-memory Throughput Processors" Jun. 3, 2016, ICS '16: Proceedings of the 2016 International Conference on Supercomputing, https://dl.acm.org/doi/10.1145/2925426.2926282 (Year: 2016).*

(Continued)

*Primary Examiner* — Michael Krofcheck
(74) *Attorney, Agent, or Firm* — FIG. 1 Patents

(57) ABSTRACT

A system includes memory hardware including a memory and a processing-in-memory (PIM) component. A system includes a host including at least one core. The PIM component includes a memory die (e.g., a dynamic random access memory (DRAM) die) and a base die, e.g., a logic die. The base die includes one or more PIM arithmetic logic units (ALU) and one or more sense amplifiers. In at least some implementations the base die includes a shared static random-access memory (SRAM) cache that is shared between different ALU that reside in the base die.

20 Claims, 5 Drawing Sheets

(56) References Cited

U.S. PATENT DOCUMENTS

| | | | |
|---|---|---|---|
| 2012/0221785 A1* | 8/2012 | Chung | G06F 12/0893 |
| | | | 711/E12.078 |
| 2013/0229846 A1 | 9/2013 | Chien et al. | |
| 2014/0019689 A1 | 1/2014 | Cain, III et al. | |
| 2015/0063039 A1 | 3/2015 | Chen et al. | |
| 2015/0325290 A1 | 11/2015 | Lasser et al. | |
| 2016/0188476 A1 | 6/2016 | Yu et al. | |
| 2017/0154667 A1 | 6/2017 | Dally | |
| 2017/0160955 A1 | 6/2017 | Jayasena et al. | |
| 2017/0263306 A1* | 9/2017 | Murphy | G11C 11/4091 |
| 2017/0353576 A1 | 12/2017 | Guim Bernat et al. | |
| 2017/0358328 A1 | 12/2017 | Barkley et al. | |
| 2018/0024948 A1 | 1/2018 | Tsai et al. | |
| 2018/0307595 A1 | 10/2018 | Leidel et al. | |
| 2019/0043560 A1 | 2/2019 | Sumbul et al. | |
| 2019/0213130 A1 | 7/2019 | Madugula et al. | |
| 2020/0042197 A1 | 2/2020 | Kotra et al. | |
| 2020/0185370 A1 | 6/2020 | Juengling | |
| 2020/0278923 A1 | 9/2020 | Jacob et al. | |
| 2021/0294741 A1* | 9/2021 | Yudanov | G11C 11/4091 |
| 2021/0303307 A1* | 9/2021 | Olson | G06F 7/5443 |
| 2021/0303355 A1 | 9/2021 | Nag et al. | |
| 2021/0406183 A1 | 12/2021 | Mashimo et al. | |
| 2022/0019442 A1* | 1/2022 | Yudanov | G06F 15/8046 |
| 2022/0164297 A1* | 5/2022 | Sity | G06F 12/1458 |
| 2022/0223196 A1 | 7/2022 | He et al. | |
| 2023/0091205 A1 | 3/2023 | Moga et al. | |
| 2023/0195314 A1 | 6/2023 | Yoshihara et al. | |
| 2023/0205693 A1* | 6/2023 | Kotra | G06F 12/0811 |
| | | | 711/122 |
| 2023/0222064 A1 | 7/2023 | Reed | |
| 2023/0229596 A1 | 7/2023 | Shulyak et al. | |
| 2023/0284459 A1 | 9/2023 | Yoo | |
| 2023/0326530 A1 | 10/2023 | Chen et al. | |
| 2023/0376234 A1 | 11/2023 | Delacruz et al. | |
| 2024/0004786 A1 | 1/2024 | Adhinarayanan et al. | |
| 2024/0008259 A1 | 1/2024 | Sharma et al. | |
| 2024/0028516 A1 | 1/2024 | Maroncelli et al. | |
| 2024/0088099 A1 | 3/2024 | Prasad et al. | |
| 2024/0395289 A1 | 11/2024 | Adhinarayanan et al. | |
| 2024/0404598 A1 | 12/2024 | Hsu | |
| 2025/0245160 A1 | 7/2025 | Scrbak et al. | |

OTHER PUBLICATIONS

Xu et al. "PIMCH: Cooperative Memory Prefetching in Processing-In-Memory Architecture" Feb. 22, 2018, 2018 23rd Asia and South Pacific Design Automation Conference (ASP-DAC), https://ieeexplore.ieee.org/abstract/document/8297307 (Year: 2018).*

Hughes et al. "Memory-side prefetching for linked data structures for processor-in-memory systems" Feb. 1, 2005, Journal of Parallel and Distributed Computing, https://www.sciencedirect.com/science/article/pii/S074373150400214X (Year: 2005).*

U.S. Appl. No. 17/855,157 , "Final Office Action", U.S. Appl. No. 17/855,157, Aug. 15, 2024, 16 pages.

U.S. Appl. No. 17/855,157 , "Final Office Action", U.S. Appl. No. 17/855,157, Jan. 24, 2024, 14 pages.

U.S. Appl. No. 17/855,157 , "Non-Final Office Action", U.S. Appl. No. 17/855,157, May 10, 2024, 15 pages.

U.S. Appl. No. 17/855,157 , "Non-Final Office Action", U.S. Appl. No. 17/855,157, Aug. 4, 2023, 13 pages.

U.S. Appl. No. 18/215,681, "Pursuant to MPEP § 2001.06(b) the applicant brings the following co-pending application to the Examiner's attention:", U.S. Appl. No. 18/215,681, Jun. 28, 2023, 30 pages.

U.S. Appl. No. 63/468,767, filed May 24, 2023 , "Pursuant to MPEP § 2001.06(b) the applicant brings the following co-pending application to the Examiner's attention:", U.S. Appl. No. 63/468,767, May 24, 2023, 22 pages.

Adhinarayanan, Vignesh , et al., "Pursuant to MPEP § 2001.06(b) the applicant brings the following co-pending application to the Examiner's attention:", U.S. Appl. No. 17/855,157, Jun. 30, 2022, 37 pages.

Bakhshalipour, Mohammad , et al., "A Survey on Recent Hardware Data Prefetching Approaches with An Emphasis on Servers", Cornell University; Arxiv; retrieved from https://arxiv.org/abs/2009.00715 on Aug. 15, 2023, Sep. 1, 2020, 23 pages.

IARPA , "Agile—Advanced Graphic Intelligence Logical Computing Environment", Office of the Director of National Intelligence; IARPA (Intelligence Advanced Research Projects Activity; retrieved from https://www.iarpa.gov/research-programs/agile on Aug. 15, 2023, 4 pages.

Jacobs, Bryan , "Hierarchical Identify Verify Exploit (HIVE)", DARPA [retrieved Jul. 6, 2023]. Retrieved from the Internet <https://www.darpa.mil/program/hierarchical-identify-verify-exploit>., 2 Pages.

Kepler Computing Inc. , "Fe-RAM Based Memory Technology", retrieved from https://www.kearney.com/service/operations-performance/article/-/insights/semiconductor-production-with-kepler-computing-supply-chain-shocks-podcast-06 on Aug. 15, 2023, 3 pages.

Lloyd, Scott , et al., "In-Memory Data Rearrangement for Irregular, Data-Intensive Computing", Computer, vol. 48, No. 8 [retrieved Dec. 13, 2023]. Retrieved from the Internet <https://doi.org/10.1109/MC.2015.230>, Aug. 2015, 7 pages.

O'Connor, Mike , et al., "Fine-Grained DRAM: Energy-Efficient DRAM for Extreme Bandwidth Systems", MICRO-50, Cambridge, MA, US; Nviidia; The University of Texas at Austin; Stanford University. Retrieved from the Internet <https://doi.org/10.1145/3123939.3124545>, Oct. 14-18, 2017, 14 pages.

O'Connor, Mike , et al., "Fine-grained DRAM: energy-efficient DRAM for extreme bandwidth systems", MICRO-50 '17: Proceedings of the 50th Annual IEEE/ACM International Symposium on Microarchitecture [retrieved Jan. 23, 2024]. Retrieved from the Internet <https://doi.org/10.1145/3123939.3124545>, Oct. 14, 2017, 14 pages.

Scrbak, Marko , et al., "Pursuant to MPEP § 2001.06(b) the applicant brings the following co-pending application to the Examiner's attention:", U.S. Appl. No. 18/428,905, filed Jan. 31, 2024, 41 pages.

Seshadri, Vivek , et al., "Gather-Scatter DRAM: In-DRAM Address Translation to Improve the Spatial Locality of Non-unit Strided Accesses", MICRO-48: Proceedings of the 48th International Symposium on Microarchitecture [retrieved Jul. 6, 2023]. Retrieved from the Internet <http://www.istc-cc.cmu.edu/publications/papers/2015/GSDRAM-gather-scatter-dram_micro15.pdf>., 14 Pages.

Talati, Nishil , et al., "Prodigy: Improving the Memory Latency of Data-Indirect Irregular Workloads Using Hardware-Software Co-Design", IEEE International Symposium on High Performance Computer Architecture (HPCA), 2021, 14 pages.

Yu, Xiangyao , et al., "IMP: Indirect Memory Prefetcher", Massachusetts Institute of Technology; Parallel Computing Lab, Intel Labs; Micro-48, 2015, 13 pages.

U.S. Appl. No. 17/855,157, "Non-Final Office Action", U.S. Appl. No. 17/855,157, Nov. 5, 2024, 17 pages.

U.S. Appl. No. 18/215,681, "Non-Final Office Action", U.S. Appl. No. 18/215,681, Jan. 22, 2025, 8 Pages.

Akin et al., "Dynamic Fine-Grained Sparse Memory Accesses," MEMSYS '18: Proceedings of the International Symposium on Memory Systems, ACM, Oct. 1, 2018, pp. 85-97.

Choi, et al., "Adaptive Granularity Based Last-Level Cache Prefetching Method with eDRAM Prefetch Buffer for Graph Processing Applications," Applied Sciences, vol. 11, No. 3, 2021, 23 pages.

Heirman et al., "Automatic Sublining for Efficient Sparse Memory Accesses," ACM Transactions on Architecture and Code Optimization (TACO), vol. 18, No. 3, Article 33, Apr. 2021, 23 pages.

Non-Final Office Action issued in U.S. Appl. No. 18/428,905, mailed Dec. 2, 2025, 24 pages.

Solihin et al., "Prefetching in an Intelligent Memory Architecture Using a Helper Thread," 5th Workshop on Multithreaded Execution, Architecture, and Compilation (MTEAC-5), MICRO-34, Dec. 2001, 8 pages.

Yoon et al., "The Dynamic Granularity Memory System," ACM SIGARCH Computer Architecture News, vol. 40, No. 3, Jun. 9, 2012, pp. 548-559.

(56)　　　　　References Cited

OTHER PUBLICATIONS

Zhang et al., "Fine-Grained Address Segmentation for Attention-Based Variable-Degree Prefetching," CF '22: Proceedings of the 19th ACM International Conference on Computing Frontiers, May 17, 2022, pp. 103-112.
Final Office Action issued in U.S. Appl. No. 18/428,905, mailed Apr. 7, 2026, 23 pages.

* cited by examiner

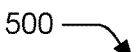

500

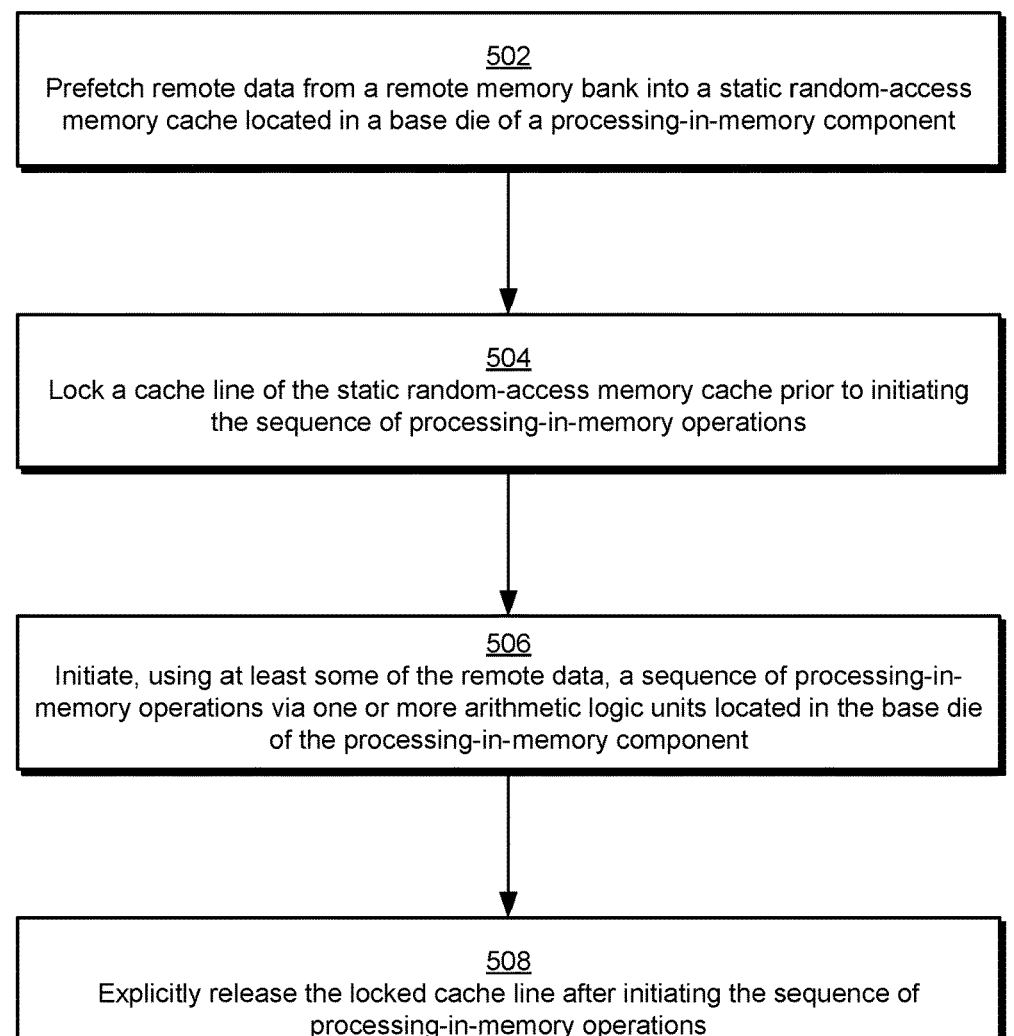

502
Prefetch remote data from a remote memory bank into a static random-access memory cache located in a base die of a processing-in-memory component

504
Lock a cache line of the static random-access memory cache prior to initiating the sequence of processing-in-memory operations

506
Initiate, using at least some of the remote data, a sequence of processing-in-memory operations via one or more arithmetic logic units located in the base die of the processing-in-memory component

508
Explicitly release the locked cache line after initiating the sequence of processing-in-memory operations

FIG. 5

ARITHMETIC LOGIC UNIT (ALU) IN A BASE DIE OF A PROCESSING-IN-MEMORY COMPONENT WITH CROSS-ALU DATA COMMUNICATION CAPABILITY

BACKGROUND

Processing-in-memory (PIM) is the integration of computational units, such as processors, accelerators, or custom logic, directly within a memory system. PIM architectures leverage the parallelism and proximity of data processing within the memory system, reducing data movement and improving overall system performance. The computational units perform operations on the data stored within memory cells without requiring data movement to separate processing units, such as a central processing unit (CPU). When a PIM-enabled memory bank receives a memory request, the computational units within the memory chips access and process the data directly from the memory cells. This reduces latency and energy consumption associated with data transfer to external processing units.

BRIEF DESCRIPTION OF THE DRAWINGS

FIG. 5 depicts a method 500 for performing PIM operations in the context of a PIM ALU located in a base die.

DETAILED DESCRIPTION

Overview

Figure 1:
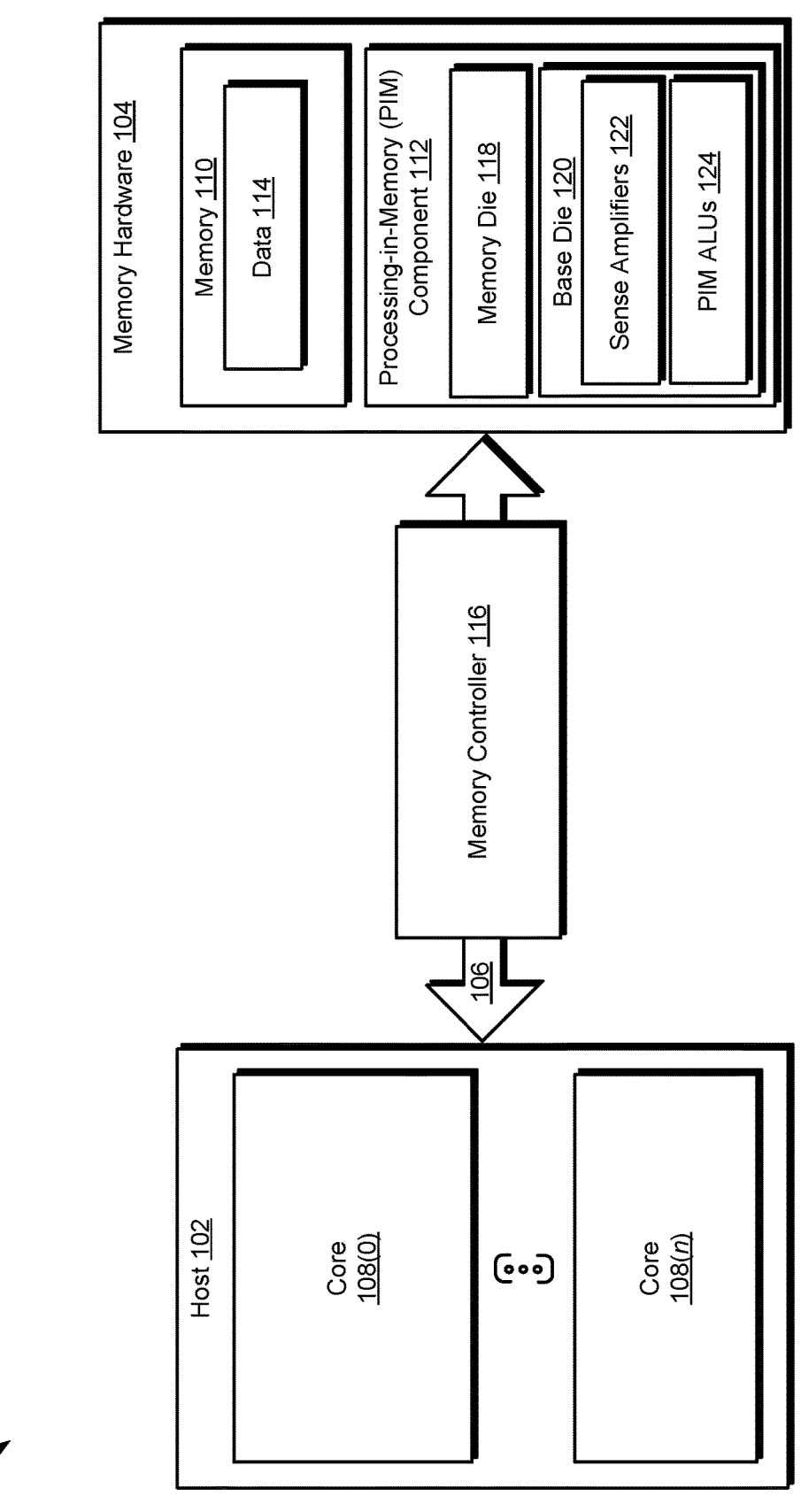
FIG. 1 is a block diagram of a non-limiting example system 100.

PIM architectures exploit the inherent parallelism and data locality of memory systems. Each memory bank independently performs computations on its portion of the data, allowing for concurrent processing across multiple memory banks and exploiting data locality for faster access. PIM architectures also facilitate inter-bank communication or data exchange during computation. Communication channels or buses enable efficient data exchange between memory banks for aggregation and result calculation.

A memory controller and PIM component work together to enable efficient and high-performance memory systems. The memory controller manages memory access and data transfer, while the PIM component leverages computational units within the memory system to process data directly within the memory, reducing data movement and enhancing system performance. The memory controller sends commands to the PIM component instructing the PIM component to perform computational operations.

The techniques described herein provide a PIM architecture where arithmetic logic units (ALU) are implemented in a base die (e.g., a logic die) of a PIM component. In implementations the PIM architecture also includes sense amplifiers and a shared SRAM cache in the base die. According to implementations this architecture provides a low-latency path from the sense amplifiers to the ALUs. Further, data from a remote bank is cached in the SRAM on the base die and is readable by any PIM ALU. According to implementations an ALU represents a combinational digital circuit that performs arithmetic and bitwise operations on integer binary numbers.

Thus, implementations provide for optimization of processing and memory operations, such as for irregular applications. An irregular application, for instance, implements frequent indirect, data-dependent accesses to single or short sequences of elements that cause high memory traffic and affect system performance. Accordingly, implementations provide for acceleration of a class of irregular memory-bound applications through PIM technology while retaining PIM's traditional advantage of exploiting per-bank bandwidth. Additionally, regular applications also experience advantages in terms of reduced software complexity.

In some aspects, the techniques described herein relate to a system including: a host including at least one core; and a processing-in-memory component communicatively coupled to the host, the processing-in-memory component including: a memory; and a base die operatively coupled to the memory, the base die including one or more arithmetic logic units and a static random-access memory cache configured to be directly accessed by the one or more arithmetic logic units.

In some aspects, the techniques described herein relate to a system, wherein the memory includes a dynamic random-access memory die.

In some aspects, the techniques described herein relate to a system, wherein the base die includes a logic die of the processing-in-memory component.

In some aspects, the techniques described herein relate to a system, wherein the base die further includes one or more sense amplifiers communicatively coupled to the one or more arithmetic logic units.

In some aspects, the techniques described herein relate to a system, wherein the base die further includes a static random-access memory cache.

In some aspects, the techniques described herein relate to a system, wherein the base die further includes multiple arithmetic logic units and wherein the multiple arithmetic logic units are configured to share the static random-access memory cache.

In some aspects, the techniques described herein relate to a system, wherein the multiple arithmetic logic units are configured to share the static random-access memory cache to access data from a remote memory bank.

In some aspects, the techniques described herein relate to a system, wherein the base die further includes: one or more sense amplifiers communicatively coupled to the one or more arithmetic logic units; a static random-access memory cache; and a multiplexer configured to: route a first type of data operation to at least one of the one or more arithmetic logic units, one or more registers, one or more accumulators, or one or more buffers; and route a second type of data operation to the static random-access memory cache.

In some aspects, the techniques described herein relate to a processing-in-memory component including: a memory die including multiple memory banks; and a base die communicatively coupled to the memory die and including one or more arithmetic logic units.

In some aspects, the techniques described herein relate to a processing-in-memory component, wherein the memory die includes a dynamic random-access memory die.

In some aspects, the techniques described herein relate to a processing-in-memory component, wherein the base die includes a logic die of the processing-in-memory component.

In some aspects, the techniques described herein relate to a processing-in-memory component, wherein the base die further includes one or more sense amplifiers communicatively coupled to the one or more arithmetic logic units.

In some aspects, the techniques described herein relate to a processing-in-memory component, wherein the base die further includes a static random-access memory cache.

In some aspects, the techniques described herein relate to a processing-in-memory component, wherein the base die further includes multiple arithmetic logic units and a static random-access memory cache, and wherein the multiple arithmetic logic units are configured to share the static random-access memory cache.

In some aspects, the techniques described herein relate to a processing-in-memory component, wherein the multiple arithmetic logic units are configured to share the static random-access memory cache to access data from a remote memory bank.

In some aspects, the techniques described herein relate to a processing-in-memory component, wherein the base die further includes: one or more sense amplifiers communicatively coupled to the one or more arithmetic logic units; a static random-access memory cache; and a multiplexer configured to route a first type of data operation to the one or more arithmetic logic units and a second type of data operation to the static random-access memory cache.

In some aspects, the techniques described herein relate to a method including: prefetching remote data from a remote memory bank into a static random-access memory cache located in a base die of a processing-in-memory component; and initiating, using at least some of the remote data, a sequence of processing-in-memory operations via one or more arithmetic logic units located in the base die of the processing-in-memory component.

In some aspects, the techniques described herein relate to a method, further including locking a cache line of the static random-access memory cache prior to initiating the sequence of processing-in-memory operations.

In some aspects, the techniques described herein relate to a method, further including explicitly releasing the locked cache line after initiating the sequence of processing-in-memory operations.

In some aspects, the techniques described herein relate to a method, wherein the prefetching the remote data from the remote memory bank into the static random-access memory cache is based at least in part on one or more prefetch indicators accompanying at least one of a read command or a write command to the processing-in-memory component.

FIG. 1 is a block diagram of a non-limiting example system 100. The illustrated system 100 includes a host 102 and a memory hardware 104, where the host 102 and the memory hardware 104 are communicatively coupled via a connection/interface 106. In one or more implementations, the host 102 represents a hardware system that includes at least one core 108. In some implementations, the host 102 includes multiple cores 108. For instance, in the illustrated example, the host 102 is depicted as including core 108(0) and core 108(n), where n represents any integer. The memory hardware 104 includes memory 110 and a PIM component 112.

In accordance with the described techniques, the host 102 and the memory hardware 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems on chips, and other computing devices or systems.

The host 102 is an electronic circuit that includes one or more cores 108 that perform various operations on and/or using data 114 stored in the memory 110. Examples of the host 102 include, but are not limited to, a central processing unit (CPU), a graphics processing unit (GPU), a field programmable gate array (FPGA), an accelerated processing unit (APU), and a digital signal processor (DSP). For example, in one or more implementations, a core 108 is a processing unit that reads and executes instructions (e.g., of a program), examples of which include to add the data 114, to move the data 114, and to branch the data 114.

In one or more implementations, the memory hardware 104 is a circuit board (e.g., a printed circuit board), on which the memory 110 is mounted and includes the processing-in-memory component 112. In some variations, one or more integrated circuits of the memory 110 are mounted on the circuit board of the memory hardware 104, and the memory hardware 104 includes one or more PIM components 112. Examples of the memory hardware 104 include, but are not limited to, a single in-line memory module (SIMM), a dual in-line memory module (DIMM), small outline DIMM (SODIMM), microDIMM, load-reduced DIMM, registered DIMM (R-DIMM), non-volatile DIMM (NVDIMM), high bandwidth memory (HBM), and the like. In one or more implementations, the memory hardware 104 is a single integrated circuit device that incorporates the memory 110 and the PIM component 112 on a single chip. In some examples, the memory hardware 104 is composed of multiple chips that implement the memory 110 and the PIM component 112 as vertical ("3D") stacks, placed side-by-side on an interposer or substrate, or assembled via a combination of vertical stacking and side-by-side placement.

The memory 110 is a device or system that is used to store information, such as the data 114, for immediate use in a device (e.g., by a core 108 of the host 102 and/or by the PIM component 112). In one or more implementations, the memory 110 corresponds to semiconductor memory where the data 114 is stored within memory cells on one or more integrated circuits. In at least one example, the memory 110 corresponds to or includes volatile memory, examples of which include random-access memory (RAM), dynamic random-access memory (DRAM), synchronous dynamic random-access memory (SDRAM) (e.g., single data rate (SDR) SDRAM or double data rate (DDR) SDRAM), ferroelectric RAM (FeRAM), resistive RAM (RRAM), a spin-transfer torque magnetic RAM (STT-MRAM), and static random-access memory (SRAM). In implementations a SRAM represents a data storage cache that uses latching circuitry (e.g., flip-flops) to store data bits in memory cells.

Broadly, the PIM component 112 is a processor and a memory combined on the same chip. The PIM component 112 is configured to process PIM memory operations, such as operations performed as part of servicing one or more requests received from the core 108 via the connection/interface 106. The PIM component 112 is representative of a processor with example processing capabilities ranging from relatively simple (e.g., an adding machine) to relatively complex (e.g., a CPU/GPU compute core). In an example, the PIM component 112 processes requests by executing associated PIM operations using the data 114 stored in the memory 110.

A request encompasses a process of requesting data (e.g., the data 114) from or sending data to the memory hardware 104. The requests are made by a processor or device (e.g., a core 108 of the host 102) to the memory hardware 104 to perform one or more memory operations.

PIM architectures contrast with conventional computer architectures that obtain data from memory, communicate the data to a remote processing unit (e.g., a core 108 of the host 102), and process the data using the remote processing unit (e.g., using a core 108 of the host 102 rather than the PIM component 112). In various scenarios, the data produced by the remote processing unit as a result of processing the obtained data is written back to memory, which involves communicating the produced data over the connection/interface 106 from the remote processing unit to memory. In terms of data communication pathways, the remote processing unit (e.g., a core 108 of the host 102) is further away from the memory 110 than the PIM component 112, both physically and topologically. As a result, conventional computer architectures suffer from increased data transfer latency, reduced data communication bandwidth, and increased data communication energy, particularly when the volume of data transferred between the memory and the remote processing unit is large, which can also decrease overall computer performance.

Thus, the PIM component 112 enables increased computer performance while reducing data transfer energy as compared to conventional computer architectures that implement remote processing hardware. Further, the PIM component 112 alleviates some memory performance and energy bottlenecks by moving one or more memory-intensive computations closer to the memory 110. Although the PIM component 112 is illustrated as being disposed within the memory hardware 104, in some examples, the described benefits of using processing-in-memory techniques are realizable through near-memory processing implementations in which the PIM component 112 is disposed in closer proximity to the memory 110 (e.g., in terms of data communication pathways) than a core 108 of the host 102.

The system 100 is further depicted as including a memory controller 116. The memory controller 116 is configured to receive the requests from the host 102 (e.g., from a core 108 of the host 102). Although depicted in the example system 100 as being implemented separately from the host 102, in some implementations, the memory controller 116 is implemented locally as part of the host 102. The memory controller 116 is further configured to schedule requests for a plurality of hosts 102, despite being depicted in the illustrated example of FIG. 1 as serving a single host 102. For instance, in an example implementation, the memory controller 116 schedules requests for a plurality of different hosts 102, where each of the plurality of different hosts 102 include one or more cores 108 that submit the requests to the memory controller 116 for scheduling with the memory hardware 104.

Further to implementations the PIM component 112 includes a memory die 118 and a base die 120. A "die," for instance, is a block of semiconducting material on which a circuit is fabricated. The memory die 118 represents a layer of the PIM component 112 that includes data storage hardware of the PIM component 112. In at least one implementation the memory die 118 represents a DRAM die. The base die 120 represents a layer of the PIM component 112 that interfaces with other components such as the memory 110 and/or the memory controller 116. In at least one implementation the base die 120 represents a logic die of the PIM component 112.

The base die 120 includes sense amplifiers 122 and a PIM ALUs 124. In implementations a sense amplifier 122 represents a circuit element that is implemented by the PIM component 112 to sense the low power signals from a bitline that represents a data bit stored in a memory cell, and to amplify the small voltage swing to recognizable logic levels so the data can be interpreted properly by logic outside the memory. The sense amplifiers 122, for instance, represent global input/output (I/O) sense amplifiers. The PIM ALUs 124 represent digital circuits that perform arithmetic and bitwise operations on binary numbers, such as part of processing and memory operations of the PIM component 112. As described throughout this disclosure, placing the PIM ALUs 124 in the base die 120 provides a low-latency path from the sense amplifiers 122 to the PIM ALUs 124.

Figure 2:
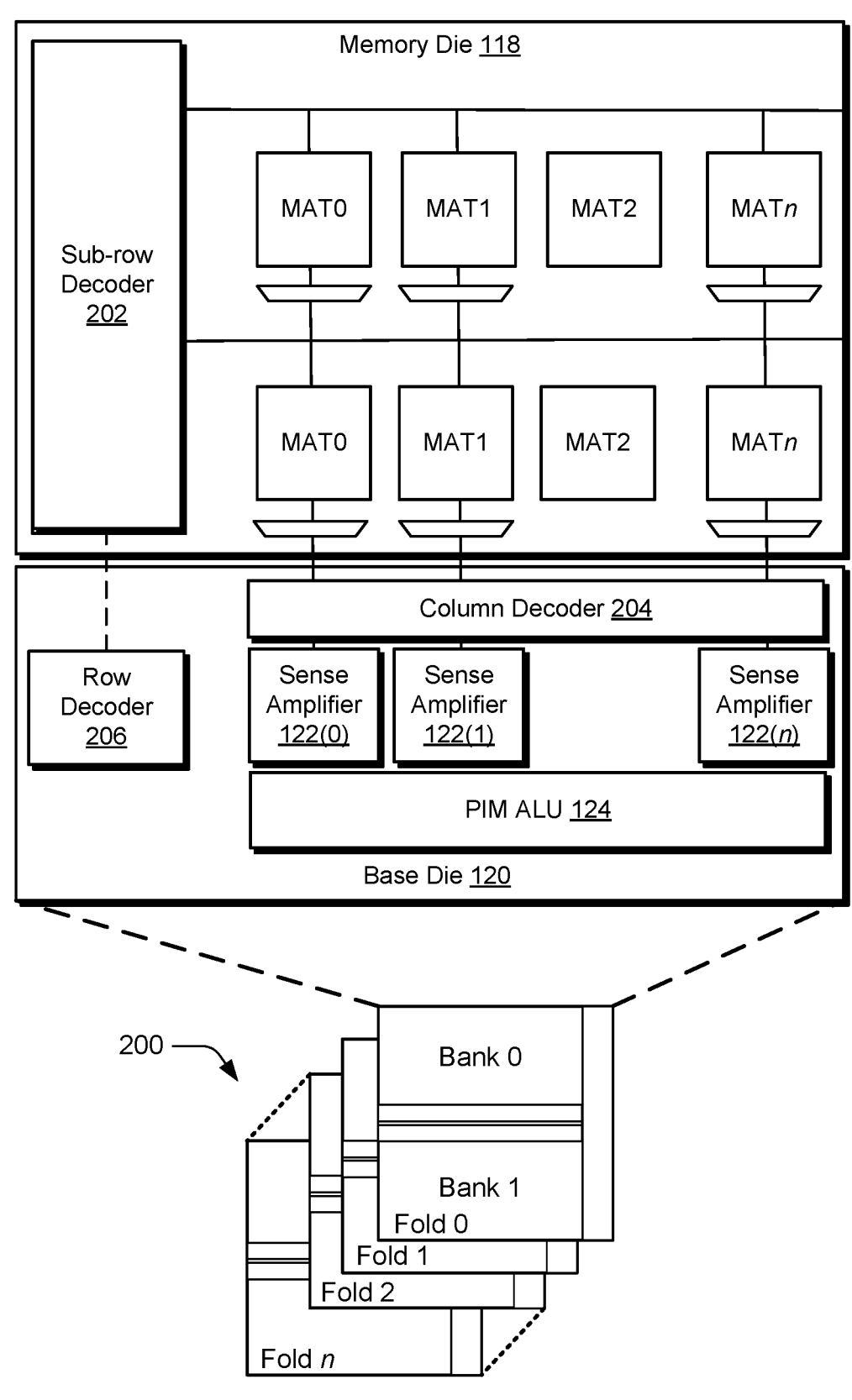
FIG. 2 illustrates a stacked memory 200 that implements a PIM ALU 124 in the base die 120.

FIG. 2 illustrates a stacked memory 200 that implements a PIM ALU 124 in the base die 120. The stacked memory 200, for instance, represents a 3D stacked memory with multiple folds (e.g., Fold 0-Fold n) where each fold includes a respective set of memory banks. The Fold 0, for instance, includes a Bank 0 and a Bank 1.

Further illustrated is that the Bank 0 includes the base die 120 communicatively coupled to the memory die 118. Further, the memory die 118 includes multiple memory arrays ("MATs") and a sub-row decoder 202 for sub-rows of the memory die 118. The base die 120 includes a column decoder 204, a row decoder 206, and multiple sense amplifiers 122. Further, a PIM ALU 124 is positioned within the base die 120 adjacent the sense amplifiers 122. While FIG. 2 is discussed with reference to a folded bank design, it is to be appreciated that implementations described herein can be employed in a variety of different memory configurations, such as other configurations of 3D stacked memories, 2D banks, implementations without the sense amplifiers 122 in the base die 120, and so forth.

Figure 3:
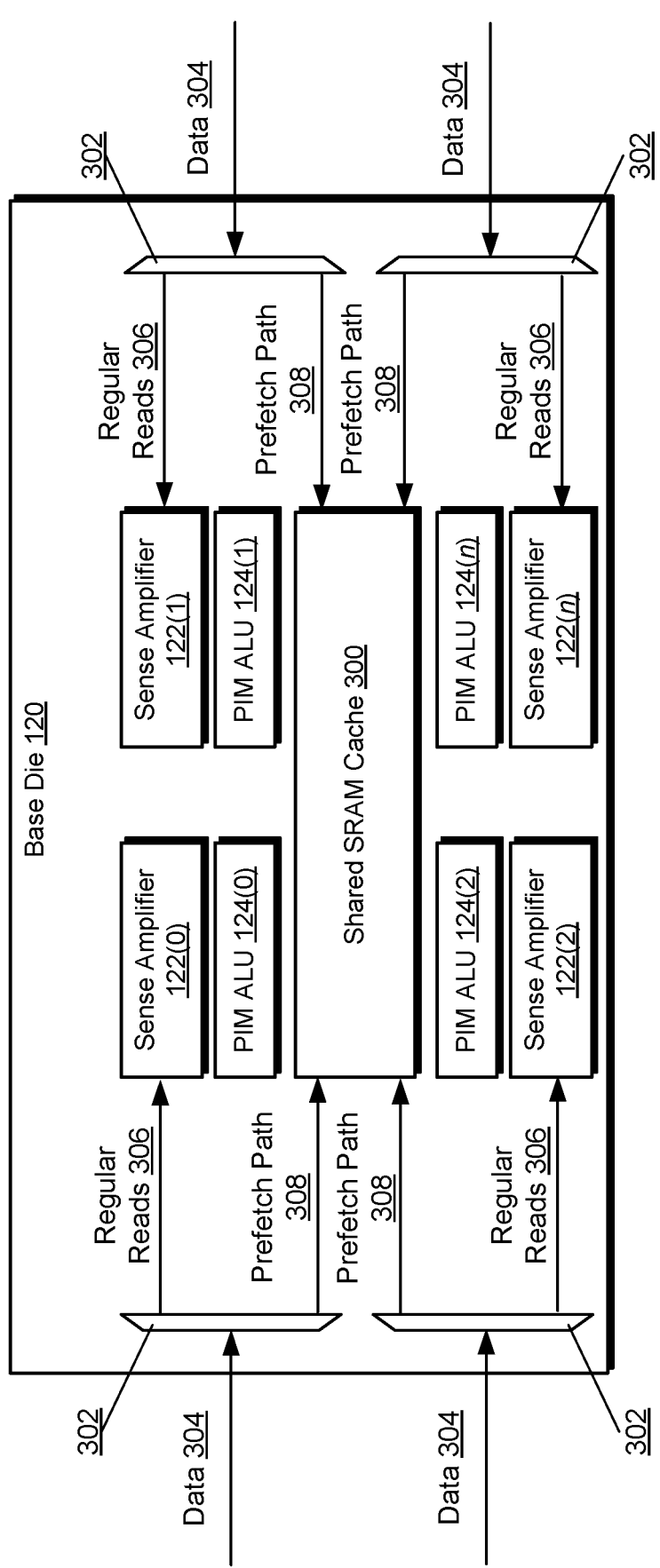
FIG. 3 illustrates an implementation of the base die 120 including a shared SRAM cache 300.

FIG. 3 illustrates an implementation of the base die 120 including a shared SRAM cache 300. In this particular example the base die 120 includes a PIM ALU 124(0), a PIM ALU 124(1), a PIM ALU 124(2), and a PIM ALU 124(n). Further, the PIM ALU 124(0) is associated with a sense amplifier 122(0), the PIM ALU 124(1) is associated with a sense amplifier 122(1), the PIM ALU 124(2) is associated with a sense amplifier 122(2), and the PIM ALU 124(n) is associated with a sense amplifier 122(n).

According to implementations the PIM ALU 124 have access to the shared SRAM cache 300. Further, a multiplexer (MUX) 302 is used to handle data 304 by the PIM component 112. According to implementations a MUX 302 represents hardware (e.g., a device) that selects between several digital input signals and forwards a selected input to an output line. For instance, via a MUX 302, regular data reads ("regular reads") 306 are routed to a respective sense amplifier 122 and to a respective ALU 124, one or more registers, one or more accumulators, and/or one or more buffers. A register, for instance, represents a quickly accessible data storage location available to a device's processor, such as the PIM component 112. Further, an accumulator represents a type of register included in a CPU that serves as a temporary storage location which stores an intermediate value in mathematical and logical calculations. According to implementations a buffer represents a region of a memory used to store data temporarily while the data is being between different locations.

Further, a prefetch path 308 via a MUX 302 is utilized to load data 304 to the shared SRAM cache 300. To load data 304 to the shared SRAM cache 300, for example, a prefetch path 308 is utilized instead of a sense amplifier 122. Alternatively or additionally the data 304 traverses the prefetch path 308 to the shared SRAM cache 300 through one or more sense amplifiers 122. In implementations a prefetch load command is decoded to set the MUX 302 to utilize the prefetch path 308. Further, at least some data operations of the data 304 are associated with prefetch indicators (e.g., prefetch instructions and/or prefetch "hints") that indicate that the data operations are to be routed via a prefetch path 308.

Figure 4:
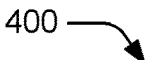
FIG. 4 illustrates a system 400 depicting different input/output sources for a PIM ALU 124 for performing PIM operations.
Figure 4:
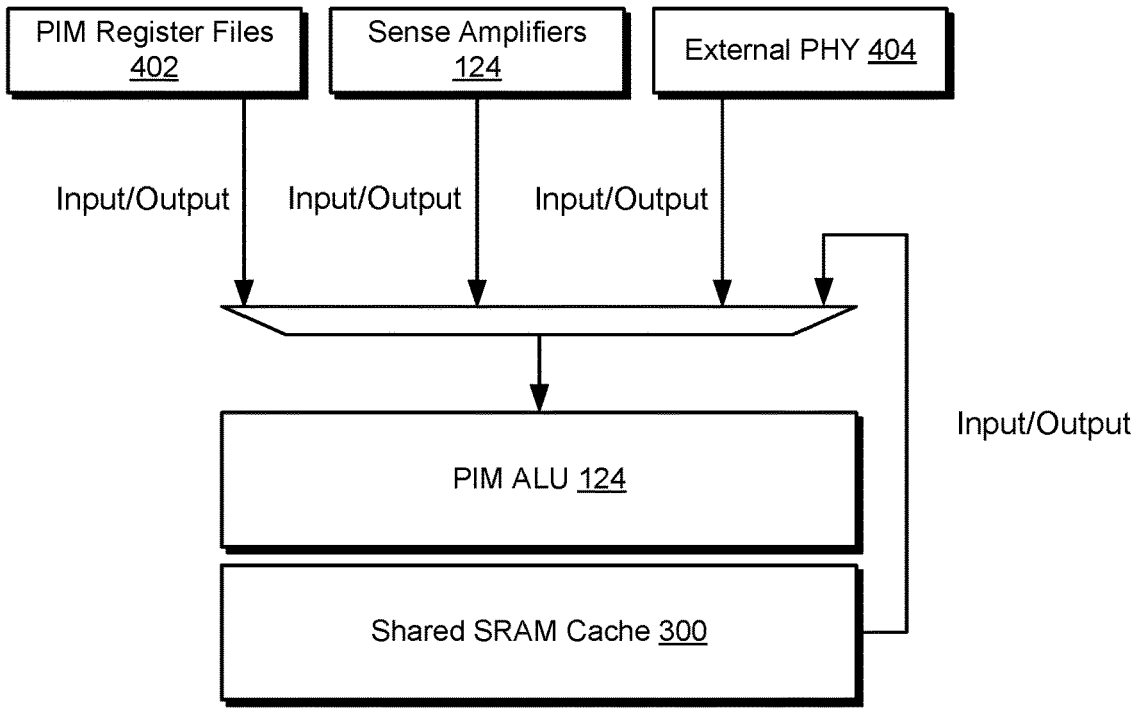

FIG. 4 illustrates a system 400 depicting different input/output sources for a PIM ALU 124 for performing PIM operations. The input/output sources include PIM register files 402, sense amplifiers 122, an external physical layer (PHY) 404, as well as the shared SRAM cache 300. A MUX 302, for instance, is utilized to appropriately route the input/output from the various input/output sources.

FIG. 5 depicts a method 500 for performing PIM operations in the context of a PIM ALU located in a base die. At block 502 remote data is prefetched from a remote memory bank into a static random-access memory cache located in a base die of a processing-in-memory component. The remote data, for instance, is prefetched from a remote memory bank into the shared SRAM cache 300. In at least one implementation prefetching the remote data from the remote memory bank into the static random-access memory cache is based at least in part on one or more prefetch indicators accompanying at least one of a read command or a write command to the processing-in-memory component.

At block 504 a cache line of the static random-access memory cache is locked. A cache line (also "cache block"), for instance, represents a unit of data transfer between a main memory and a cache. At block 506 a sequence of processing-in-memory operations via one or more arithmetic logic units located in the base die of the processing-in-memory component are initiated using at least some of the remote data. For instance, the cache line is locked prior to initiating the sequence of processing-in-memory operations via one or more arithmetic logic units located in the base die of the processing-in-memory component. At block 508 the locked cache line is explicitly released after initiating the sequence of processing-in-memory operations.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the host 102, the memory hardware 104, the interface 106, the core 108, the memory 110, the PIM component 112, the memory controller 116, etc., are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
   a host including at least one core; and
   a processing-in-memory component communicatively coupled to the host, the processing-in-memory component comprising:
   a memory; and
   a base die operatively coupled to the memory, the base die comprising:
   one or more arithmetic logic units; and
   a static random-access memory cache configured to be directly accessed by the one or more arithmetic logic units, wherein the one or more arithmetic logic units and the static random-access memory cache are positioned within the base die of the processing-in-memory component, wherein the base die further comprises a multiplexer configured to route a first type of data operation to the one or more arithmetic logic units and a second type of data operation to the static random-access memory cache.

2. The system of claim 1, wherein the memory comprises a dynamic random-access memory die.

3. The system of claim 1, wherein the base die comprises a logic die of the processing-in-memory component.

4. The system of claim 1, wherein the base die further comprises one or more sense amplifiers communicatively coupled to the one or more arithmetic logic units.

5. The system of claim 1, wherein the base die further comprises multiple arithmetic logic units and wherein the multiple arithmetic logic units are configured to share the static random-access memory cache.

6. The system of claim 5, wherein the multiple arithmetic logic units are configured to share the static random-access memory cache to access data from a remote memory bank.

7. The system of claim 1, wherein the base die further comprises one or more sense amplifiers communicatively coupled to the one or more arithmetic logic units.

8. A processing-in-memory component comprising:
   a memory die comprising multiple memory banks; and
   a base die communicatively coupled to the memory die and comprising:
   one or more arithmetic logic units;
   a static random-access memory cache; and a multiplexer configured to route a first type of data operation to the one or more arithmetic logic units and a second type of data operation to the static random-access memory cache.

9. The processing-in-memory component of claim 8, wherein the memory die comprises a dynamic random-access memory die.

10. The processing-in-memory component of claim 8, wherein the base die comprises a logic die of the processing-in-memory component.

11. The processing-in-memory component of claim 8, wherein the base die further comprises one or more sense amplifiers communicatively coupled to the one or more arithmetic logic units.

12. The processing-in-memory component of claim 8, wherein the base die further comprises multiple arithmetic logic units, and wherein the multiple arithmetic logic units are configured to share the static random-access memory cache.

13. The processing-in-memory component of claim 12, wherein the multiple arithmetic logic units are configured to share the static random-access memory cache to access data from a remote memory bank.

14. The processing-in-memory component of claim 8, wherein the base die further comprises one or more sense amplifiers communicatively coupled to the one or more arithmetic logic units.

15. A method comprising:
prefetching remote data from a remote memory bank into a static random-access memory cache located in a base die of a processing-in-memory component; and
initiating, using at least some of the remote data, a sequence of processing-in-memory operations via one or more arithmetic logic units located in the base die of the processing-in-memory component, wherein the base die further comprises a multiplexer configured to route a first type of data operation to the one or more arithmetic logic units and a second type of data operation to the static random-access memory cache.

16. The method of claim 15, further comprising locking a cache line of the static random-access memory cache prior to initiating the sequence of processing-in-memory operations.

17. The method of claim 16, further comprising explicitly releasing the locked cache line after initiating the sequence of processing-in-memory operations.

18. The method of claim 15, wherein the prefetching the remote data from the remote memory bank into the static random-access memory cache is based at least in part on one or more prefetch indicators accompanying at least one of a read command or a write command to the processing-in-memory component.

19. The method of claim 15, wherein the base die further comprises one or more sense amplifiers communicatively coupled to the one or more arithmetic logic units.

20. The method of claim 15, wherein the base die comprises a logic die of the processing-in-memory component.

* * * * *